Jan. 16, 1968     P. C. PATERSON     3,363,952
DUAL LIP SEAL
Filed Sept. 3, 1965
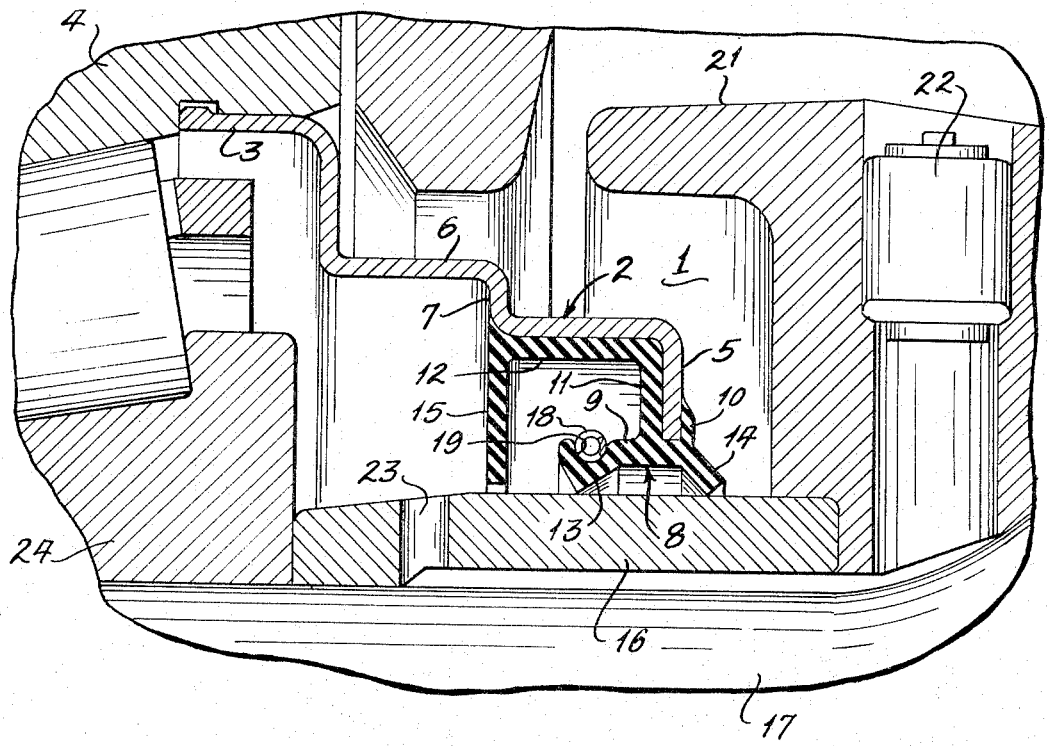
INVENTOR:
PETER C. PATERSON
BY Gravely, Lieder + Woodruff
ATTORNEYS.

United States Patent Office 3,363,952
Patented Jan. 16, 1968

3,363,952
DUAL LIP SEAL
Peter C. Paterson, Canton, Ohio, assignor to The Timken Roller Bearing Company, Canton, Ohio, a corporation of Ohio
Filed Sept. 3, 1965, Ser. No. 484,900
1 Claim. (Cl. 308—187.1)

ABSTRACT OF THE DISCLOSURE

A seal and seal case bonded together to consist of one part cooperating with the shaft or axle bearing to be sealed such that only a separate spring element is required to retain the seal lip in sealed running position and an integral spring retainer portion of the seal prevents the spring element entering the bearing to cause possible failure.

---

This invention relates to a dual lip seal for rotary shafts and more particularly to a dual lip seal for rotary shafts having a seal member integrally bonded to a seal casing on opposite sides of an inwardly directed radial flange and includes an integral spring retainer to prevent a sealing pressure spring from becoming separated from the seal during operation.

Various shaft seal arrangements including a fluid sealing lip and a dust sealing lip have been proposed for dual lip seals. Most such seals require numerous parts and components to achieve the desired result. Many require several metal parts to support and retain the sealing lips as well as to prevent sealing pressure springs becoming separated from the seal member. Many such seals require several metal parts to support and retain the sealing lips. Moreover, the complexity of the seals affects the ability to dissipate the heat from the seal.

The present invention provides a simple and inexpensive construction for dual lip seals with a special integral spring retainer. Briefly, the invention provides an integral, resilient elastomer bonded directly to a single radial flange of a seal casing, provides both a fluid sealing lip and a dust sealing lip on opposite sides of the radial flange diagonally diverging therefrom, and as well, includes an integrally molded spring retainer in the proximity of the fluid sealing lip.

Although not limited to any particular type of shaft sealing application, the dual lip seal is especially desirable in railway car axle journal applications. The seal casing for the dual lip seal is readily snapped into the bearing assembly of a railway car axle journal. The sealing lips may ride directly on the axle to be sealed or on a seal wear ring which is press fitted to the shaft or to a spacer ring on the axle.

It is therefore an object of the invention to provide a dual lip seal including a seal member integrally bonded to a radial flange of a seal casing, and having an integrally molded spring retainer for a sealing pressure spring;

It is another object of the invention to provide a dual lip seal having an integrally molded seal member and spring retainer for a sealing pressure spring which is simple and easy to manufacture;

It is another object of the invention to provide a dual lip seal for a railway car axle journal including a seal casing having an inwardly directed radial flange, and an integral resilient seal member bonded onto the radial flange of the seal casing which has an integral spring retainer;

It is another object of the invention to provide a dual lip seal for a railway car axle journal having a seal casing, a seal member bonded to a radial flange of said casing which has an integral spring retainer extending from said seal member in the proximity of a sealing lip utilizing a sealing pressure spring;

It is another object of the invention to provide a dual lip seal for the railway car axle journal having a seal casing, a seal member bonded to an inwardly directed radial flange of said casing and having an integral fluid lip seal, an integral dust lip seal and an integral spring retainer axially adjacent said fluid seal lip.

These and other objects and advantages of the invention will become apparent from the ensuing description taken in conjunction with the sole figure which illustrates a partial cross sectional view of the dual lip seal in a railway car axle journal.

Referring to the figure, the dual lip seal 1 includes a seal casing 2 seated by the cylindrical flange 3 at one end of the seal casing 2 in a recess in the internal surface of a bearing cup 4 in the bearing assembly of a railway car axle journal. The other end of the seal casing 2 has an inwardly directed radial flange 5 extending from the cylindrical body 6 of the seal casing. The cylindrical body 6 has a central shoulder 7. A resilient integral seal member 8 having a body portion 9 is bonded to the outer portion of radial flange 5 by a lip portion 10, and is bonded to the inner surface of radial flange 5 by a circular portion 11 and to the inner surface of the cylindrical body 6 of seal casing 2 intermediate shoulder 7 and radial flange 5 by a cylindrical portion 12 of the seal member 8. A fluid sealing lip 13 extends from the body portion 9 beneath the cylindrical portion 12. A dust sealing lip 14 extends from the body portion 9 diagonally outwardly from the radial flange 5. A spring retainer portion 15 extends radially inward from the cylindrical portion 12 of the seal member 8 axially adjacent the fluid sealing lip 13. The fluid sealing lip and the dust sealing lip engage seal wear ring 16 which is press fitted to axle 17 and rotates therewith. A garter spring 18 is positioned in a depression 19 on the backside of fluid sealing lip 13 to maintain sealing pressure between the fluid sealing lip 13 and the seal wear ring 16. It will be appreciated that the spacing between the retainer portion 15 of seal member 8 and the fluid sealing lip 13 is sufficient to prevent garter spring 18 is dislodged from the depression 19 from exerting a biasing force on the retainer portion and entering the bearing assembly. Thus, the retainer portion 15 is effective to prevent a broken spring from entering the bearing assembly causing damage.

In the particular railway axle journal utilizing the dual lip seal as illustrated in the sole figure, the seal member is applied over a seal wear ring 16 which is press fitted to the axle 17 and abuts a backing ring 21 which includes a vent fitting 22. The seal wear ring includes a port 23. Thus a venting passage is provided from vent fitting 22 along axle 17 and through port 23 to the bearing assembly. With the seal member over the wear ring, the bearing assembly, including the bearing cup 4 and a bearing cone 24, is fitted over the axle 17. Then, cylindrical flange 3 of seal casing 2 is snapped into the bearing cup 4 and the cone 24 is positioned abutting the seal wear ring 16. Thus, the bearing assembly locates the seal member on the seal wear ring 16.

It will be appreciated from the foregoing that the dual lip seal is formed from a simple metal stamping to which a seal member having dual sealing lips and a spring retainer is bonded to form a single unit. The only other part necessary to obtain a good sealing to the axle bearing is a garter spring which maintains good sealing pressure on the fluid sealing lip. Thus, the invention provides a dual lip seal which is self-contained and prevents possible damage to the bearing from the garter spring becoming broken or dislodged or disconnected from the fluid seal lip.

It will be appreciated that various changes and modifications will be apparent to those skilled in the art, and all such changes are contemplated by the invention. All such changes and modifications are deemed to be within the scope of the invention which is limited only by the scope of the appended claim.

What is claimed is:

1. In a railway car axle journal including a bearing assembly, a backing ring and a wear ring seated on the axle of said journal between said bearing assembly and said backing ring, a dual lip seal comprising a cylindrical seal casing having a central shoulder and having an inwardly directed radial flange defining a free end with an outer surface and an inner surface, a resilient seal member having a body portion, a circular portion and a radial lip portion, said seal member bonded over the free end of said radial flange along the outer surface by said lip portion and along said inner portion by said circular portion, said seal member having a cylindrical portion integral with said circular portion and bonded to the inner surface of said seal casing between said central shoulder and said radial flange and having a fluid sealing lip adjoining said body portion and extending beneath said cylindrical portion and seated against said wear ring, said fluid sealing lip defining a depression in the backside thereof, a garter spring seated in said depression to maintain sealing pressure against said wear ring, said seal member having an integral dust sealing lip extending diagonally outward from said body portion beyond said lip portion and seated on said wear ring, said seal member having an integral resilient retainer portion extending radially inward from said cylindrical portion axially adjacent said fluid sealing lip and spaced from said wear ring, said space being smaller than the diameter of said garter spring, and said retainer portion being axially spaced from said fluid sealing lip portion by at least the diameter of said garter spring.

References Cited

UNITED STATES PATENTS

| | | | |
|---|---|---|---|
| 2,493,255 | 1/1950 | Lillis | 277—35 |
| 2,736,585 | 2/1956 | Riesing | 277—153 |
| 2,834,616 | 5/1958 | Gebert et al. | 308—187.1 X |
| 2,879,114 | 3/1959 | Bowen | 277—153 X |
| 3,099,454 | 7/1963 | Walinski | 277—153 X |
| 3,207,521 | 9/1965 | Dega | 277—58 X |

FOREIGN PATENTS

| | | |
|---|---|---|
| 703,022 | 2/1965 | Canada. |
| 724,859 | 2/1955 | Great Britain. |

MARTIN P. SCHWADRON, *Primary Examiner.*

ROBERT A. DUA, *Examiner.*